Oct. 13, 1959     C. W. VOGT     2,908,383
PACKAGES AND PACKAGING
Filed May 18, 1956     2 Sheets-Sheet 1
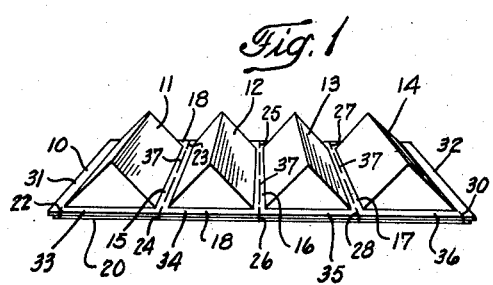
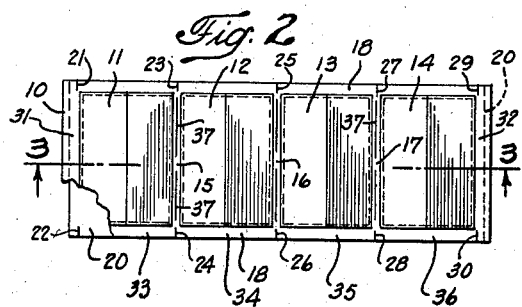
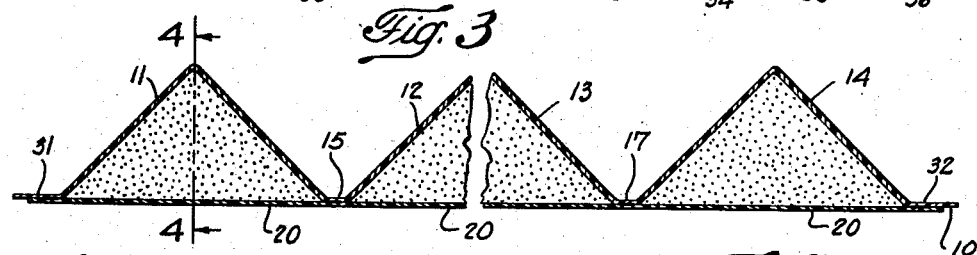
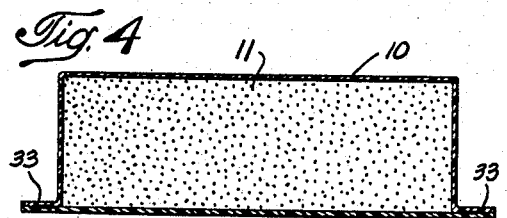
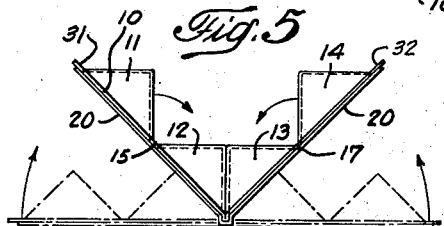
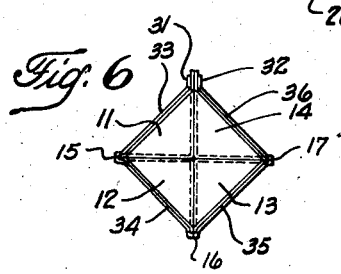
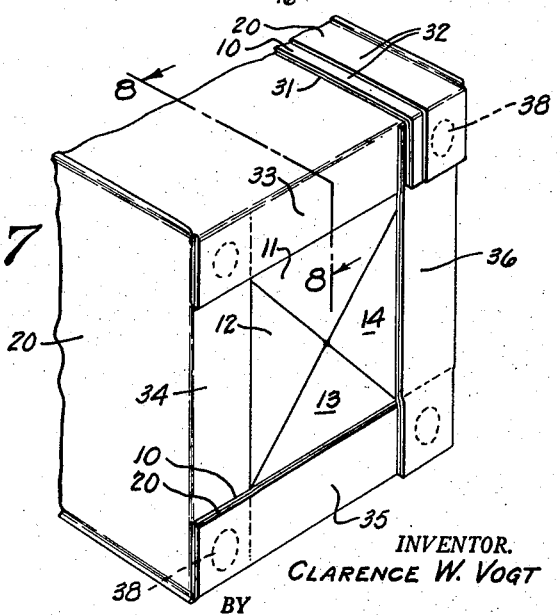
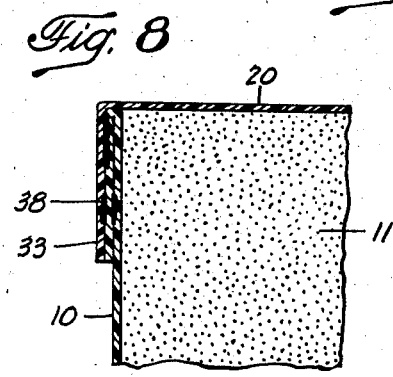
INVENTOR.
CLARENCE W. VOGT
BY
his ATTORNEYS Oct. 13, 1959 — C. W. VOGT — 2,908,383
PACKAGES AND PACKAGING
Filed May 18, 1956 — 2 Sheets-Sheet 2

INVENTOR.
CLARENCE W. VOGT
BY
ATTORNEYS

United States Patent Office 2,908,383
Patented Oct. 13, 1959

2,908,383

PACKAGES AND PACKAGING

Clarence W. Vogt, Weston, Conn.

Application May 18, 1956, Serial No. 585,774

6 Claims. (Cl. 206—65)

This invention relates to improvements in packages and it relates particularly to improvements in multiple unit packages suitable for the packaging of plastic materials, finely divided or powdered or other fluent materials such as flour, cake and pie mixes, butter, margarine and the like.

As disclosed in my co-pending application Serial No. 585,775, filed on an even date, multiple unit packages of the type embodying the present invention can be made by deforming a heated sheet of thermoplastic material by pneumatic or other forming means to provide a plurality of pockets or receptacles in the sheet into which a material can be blown to fill the receptacles. The receptacles, with the material therein, can then be sealed by applying a sheet in covering relation to the open mouths of a plurality of the receptacles and heat sealing or otherwise bonding the cover sheet to the sheet in which the pockets or receptacles are formed. Further, in accordance with the present invention, by suitably selecting the shape and the relation of the individual receptacles in the sheet, they may be folded into a juxtaposed relation in such a manner as to form a square package or package of other polygonal cross section which may be suitably reinforced and secured together in such a manner to render it resistant to deformation while enabling it to be opened readily so that one or more of the units can be detached therefrom as required.

In a preferred form of the invention, the individual receptacles may be in the form of troughs of generally triangular or wedge-shaped cross section which are separated by narrow webs serving as hinges to enable the filled and sealed receptacles to be folded one against the other thereby forming a package which is square or other polygonal cross section. By suitably bonding the opposite ends of the package together by spot seals or the like, the entire assembly is maintained in the aforementioned polygonal cross section shape and may further be reinforced and strengthened by bonding the edge flanges against the ends of the package and to each other, thereby forming a strongly reinforced yet readily opened package.

By selection of the materials making up the package, that is, the sheet material used in its formation, it is possible to form substantially transparent packages disclosing the contents thereof, translucent or opaque packages on which clearly defined and colorful printed matter may be readily formed for display or ornamental purposes.

For a better understanding of the present invention, reference may be had to the accompanying drawings in which:

Figure 1 is a perspective view of a partially completed package of the type embodying the present invention after filling and sealing;

Figure 2 is a plan view of the package shown in Figure 1;

Figure 3 is a view in section taken on line 3—3 of Figure 2 and partially broken away disclosing details of the package;

Figure 4 is a view in section taken on line 4—4 of Figure 3;

Figure 9:
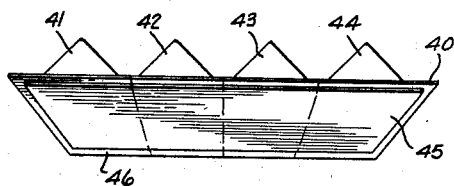
Figure 10:
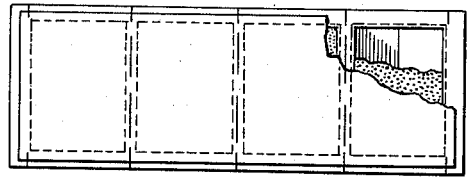
Figure 11:
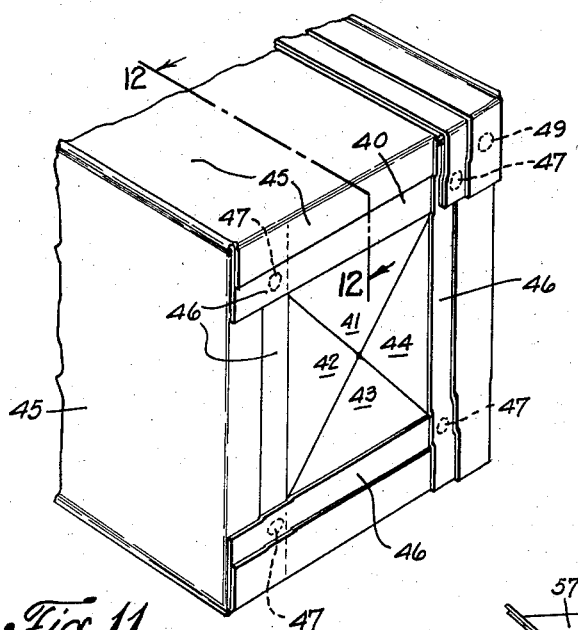
Figure 12:
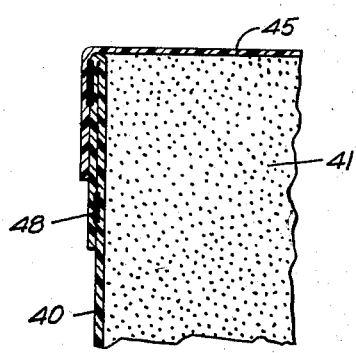
Figure 13:
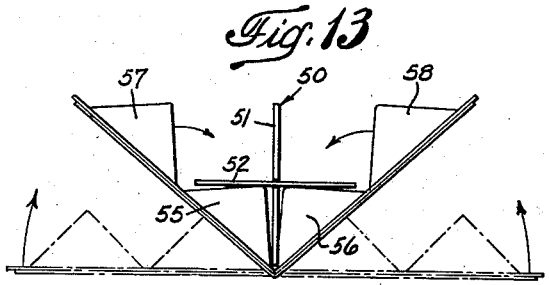
Figure 14:
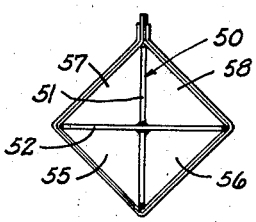
Figure 15:
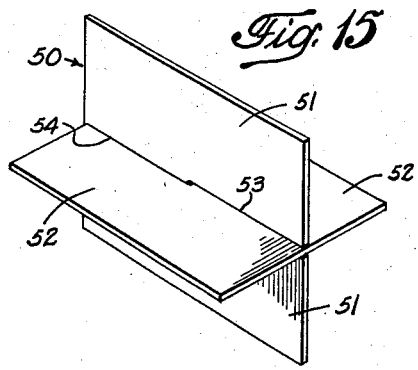

Firgure 5 is an end elevational view of the package in a partially folded condition;

Figure 6 is an end elevational view of the package with all units thereof folded and secured in folded relation;

Figure 7 is a perspective view of a completed package illustrating the arrangement of the end flaps of the package;

Figure 8 is a view in section taken on line 8—8 of Figure 7;

Figure 9 is a perspective view of a modified form of package prior to folding disclosing the portion of the package which forms its outer surface or cover;

Figure 10 is a plan view of the package partially broken away to disclose a detail of the receptacle;

Figure 11 is a perspective view of the end portion of the package illustrating the arrangement of the end flaps and seals thereon;

Figure 12 is a view in section taken on line 12—12 of Figure 11;

Figure 13 is an end elevational view illustrating the folding of the package in an intermediate stage and a reinforcement therefor;

Figure 14 is an end elevational view of the partially completed package with the reinforcing element therein; and Figure 15 is a perspective view of a reinforcing member for the package of the type embodying the present invention.

The package shown in Figures 1 to 8 of the drawings includes a base sheet member 10 which may be formed of a thermoplastic material such as polyethylene, "Mylar," ethylcellulose, polyvinylidene, or the like. The sheet 10 which is initially flat can be formed with or shaped to provide a plurality of pockets or receptacles 11, 12, 13 and 14, each separated from the other by means of narrow web portions 15, 16 and 17, and surrounded by a flat rim portion 18. The receptacles formed in the sheet 10 are, as illustrated, generally of wedge-shaped formation having a triangular cross section. The cross-sectional shape is a right isosceles triangle having its base, i.e., its open side, in the plane of the sheet 10.

The individual receptacles 11, 12, 13 and 14 can be filled with the material to be packaged such as, for example, flour, a prepared cake mix or pie-crust mix and the like, and after filling are closed by means of a cover sheet 20. As illustrated in Figures 1 to 8, the cover sheet 20 is of about the same length and width as the length and width of the sheet 10 and is sealed to the sheet 10 around the rim 18 and across the webs 15, 16 and 17 by a heat-sealing operation. To facilitate sealing, the sheet 20 may be either a thermoplastic and heat-sealable material of the type described above, or it may consist of a sheet of paper or the like having a surface coating of a heat-sealable material. As shown in Figures 3 and 4, the sheet 20 is sealed to the rim 18 and the webs 15, 16 and 17 completely around each of the receptacles 11, 12, 13 and 14. After sealing the cover sheet 20 to the sheet 10, the edges of the package may be provided with slits 21, 22, 23, 24, 25, 26, 27, 28, 29 and 30 at each corner of each receptacle to divide the rim portion 18 into the opposite end flaps 31 and 32 and four narrow edge flaps 33, 34, 35 and 36 at the ends of the receptacles. Also, the web portions 15, 16 and 17 may be provided with scoring or slits 37 to enable the individual packages to be detached from each other.

Inasmuch as it is customary to sell many products in the form of elongated bricks of square or rectangular cross section, the multi-unit packages described above can be readily adapted to such requirements in the manner best shown in Figures 5 to 8. Thus, the package can be folded at the mid-portion of the web 16 to bring the side faces of the receptacles 12 and 13 into engagement and then the receptacles 11 and 14 can be folded inwardly to bring their adjacent faces into contact with the faces of the receptacles 12 and 13 as illustrated in Figures 5 and 6. When the folding operation is completed, the end flaps 31 and 32 are heat or spot sealed together thereby holding the packages in their assembled relation and forming a package of approximately square cross section having at this stage the end flaps 33, 34, 35 and 36 extending outwardly from the opposite ends of the package. The end flaps are used to reinforce the package by folding them inwardly and securing them together in the manner shown in Figures 7 and 8. Thus, the end flap 34 is folded against the end of the package and the end flaps 33 and 35 are folded over the flap 34 and spot sealed thereto. Then the end flap 36 is folded over the end of the package to overlie the ends of the flaps 33 and 35 and is secured to them by means of spot seals. The fin provided by the end flaps 31 and 32 can be folded down against the back of the package 11 and its ends folded over the end flap 36 and also retained by means of a spot seal 38. This provides a reinforcing structure which prevents endwise and lateral shifting of the receptacles relative to each other.

When one or more units or receptacles are to be separated from the package, the ends of the flaps 31 and 32 can be raised and the seal broken between the flaps 31 and 32. The folded-down end flap 36 can then be released after which the package 14 can be swung out and detached along the slits 37 in the web 17. Other units can be detached successively by releasing the flaps 35, 34 and 33.

Figures 9 to 12 illustrate a modified form of package which includes a base sheet 40 similar to the sheet 10 having similar receptacles 41, 42, 43 and 44 formed therein. In this package, the cover sheet 45 is somewhat smaller in external dimensions than the external dimensions of the package 14 so that a narrow portion of the rim flange 46 is left uncovered when the cover sheet 45 is bonded to the rim flange and the webs between the receptacles 41, 42, 43, 44. When this form of package is folded and the end flaps are folded over as illustrated in Figures 11 and 12, narrow areas of the rim flange 46 are left uncovered by the cover sheet 45. Inasmuch as these flaps are secured by means of the spot seals 47, the flap can be released easily from the end of the package. This is particularly convenient for releasing the fin seal 48 which joins the opposite ends of the package and is secured to the underlying flap by means of a spot seal 49.

If the material in the package is substantially form retaining, reinforcement of the package other than by the cover sheet and the base sheet is usually unnecessary. However, with such fluent materials as flour, cake and pie-dough mixes, deformation of the package may occur unless further reinforcement is provided.

A suitable form of reinforcing member is shown in Figures 13 to 15. The reinforcing member 50 is generally cross shaped and is formed of sheets of thin cardboard or the like. As shown in Figure 15, the reinforcing member can be made by forming two rectangular sheets of cardboard 51 and 52 with slots 53 and 54 extending about half their length so that they can be slipped together in right angular relation. The reinforcing member 50 has one side inserted between the two receptacles 55 and 56 of the package and when the other two receptacles 57 and 58 are folded inwardly, the reinforcing member 50 is substantially coextensive with and engages the sides of the receptacles 57 and 55, 56 and 58, as shown in Figure 14 and thereby forms a supporting skeleton which can withstand substantial stress and will maintain the package in its generally prism-like shape.

It will be appreciated that the reinforcing member 50 can be made such as, for example, by sewing together two rectangular sheets of material along their center line and then bending the portions on each side of the center line into right angular relation, or by cementing the sheets together in a similar way, or in any other way to form the shape desired.

Inasmuch as the end flaps of the packages are folded against the ends of the package, it will be understood that the reinforcing member 50 cannot move endwise in the finished package and it, in turn, aids in preventing endwise as well as lateral displacement of the individual receptacles. Such a reinforcing member, permits the packages to be formed of thin and flexible material and maintains them in the proper shape and relation.

It will be understood that the packages may be made of any desired size depending upon requirements and they may be provided with surface ornamentation, advertising or the like. By suitably forming the individual receptacles, packages of polygonal cross section other than square may be made. Moreover, the composite packages may be maintained in assembled or folded relation by means of a band passing around them rather than by sealing their end flaps together. Inasmuch as the packages are susceptible to considerable modification without departing from the invention, it should be understood that the forms of the invention disclosed herein are illustrative and should not be considered as limiting the scope of the following claims.

I claim:

1. A multi-unit package comprising an inner sheet member having a plurality of substantially wedge-shaped receptacles for fluent material, said sheet member having web portions around the peripheries of said receptacles and joining them in edge-to-edge relation, a cover sheet united with said web portions and overlying and closing said receptacles, said cover sheet and sheet member being folded to dispose said cover sheet outwardly to form the sides of a polygonal package and with the wedge shaped receptacles extending inwardly therefrom into side-by-side relation, and a reinforcing member inside said package and having stiffened sheet portions extending between the receptacles and substantially into engagement with the webs between said receptacles.

2. A multi-unit package comprising an inner sheet member having a plurality of substantially wedge-shaped receptacles for fluent material, said sheet member having web portions around the peripheries of said receptacles and joining them in edge-to-edge relation, and a cover sheet united with said web portions and overlying and closing said receptacles, said cover sheet and sheet member being folded to dispose said cover sheet outwardly to form the sides of a polygonal package and with the wedge-shaped receptacles extending inwardly therefrom into side-by-side relation, the webs at the ends of said receptacles being disposed against and detachably adhered to the ends of said package.

3. A multiple unit package comprising an inner sheet member having a plurality of wedge-shaped receptacles formed therein joined to each other in spaced relation by peripheral rim and web portions, each receptacle having sides converging away from said rim and web portions and substantially triangular ends, a cover sheet united with said rim and web portions to seal said receptacles, said cover sheet and sheet member being folded along parallel lines between said receptacles to dispose said cover sheet outwardly and said receptacles inwardly with their sides in side-by-side relation to render said package substantially polygonal in cross section, and a reinforcing member disposed within said package, said reinforcing member having relatively stiff sheet-like portions positioned between and substantially coextensive with the sides of said receptacles.

4. A multiple unit package comprising an inner sheet member having a plurality of wedge-shaped receptacles formed therein joined to each other in spaced relation by peripheral rim and web portions, each receptacle having sides converging away from said rim and web portions and substantially triangular ends, a cover sheet united with said rim and web portions to seal said receptacles, said cover sheet and sheet member being folded along parallel lines between said receptacles to dispose said cover sheet outwardly and said receptacles inwardly with their sides in side-by-side relation to render said package substantially polygonal in cross section, and a reinforcing member having a plurality of reinforcing sheet portions in cross-shaped formation, said sheet portions being disposed between and substantially coextensive with the sides of said receptacles.

5. A multiple unit package comprising an inner sheet member having a plurality of wedge-shaped receptacles formed therein joined to each other in spaced relation by peripheral rim and web portions, each receptacle having sides converging away from said rim and web portions and substantially triangular ends, a cover sheet united with said rim and web portions to seal said receptacles, said cover sheet and sheet member being folded along parallel lines between said receptacles to dispose said cover sheet outwardly and said receptacles inwardly with their sides in side-by-side relation to render said package substantially polygonal in cross section, and some of said rim portions being folded against said triangular ends and detachably united with each other.

6. A multi-unit package comprising an inner sheet member having four substantially similar wedge-shaped receptacles for fluent material, webs integrally securing said receptacles together in side by side relation, each receptacle having a cross sectional shape of an isosceles triangle, the sides of which are perpendicular to each other, each of said receptacles further having triangular end walls, the free edges of the end and side walls of each receptacle defining an open rectangular mouth, said multi-unit having a peripheral web joining the ends of the first named webs and lying in the plane thereof and in the plane of the mouth of each of the receptacles, said multi-unit further including a cover sheet having portions adhered to said peripheral webs of the receptacles and closing the same, said units being folded along lines longitudinally traversing said first named webs, with said cover sheet outwardly, to form a four sided package with the vertices of the triangular receptacles extending inwardly therefrom to the center of said package, said triangular receptacles being releasably retained in side by side relation.

References Cited in the file of this patent

UNITED STATES PATENTS

| | | |
|---|---|---|
| 1,095,671 | Pitkin | May 5, 1914 |
| 1,108,005 | Rey | Aug. 18, 1914 |
| 1,591,087 | Holliday | July 6, 1926 |
| 2,633,986 | Vogt | Apr. 7, 1953 |

FOREIGN PATENTS

| | | |
|---|---|---|
| 154,076 | Germany | Nov. 11, 1904 |